United States Patent [19]

Luck

[11] Patent Number: 4,767,253

[45] Date of Patent: Aug. 30, 1988

[54] TUNNEL CLEANING TRAIN

[75] Inventor: Dieter G. Luck, Johannesburg, South Africa

[73] Assignee: General Mining Union Corporation Limited, South Africa

[21] Appl. No.: 337,163

[22] Filed: Jan. 5, 1982

[30] Foreign Application Priority Data

Jan. 9, 1981 [ZA] South Africa ............. 81/0124
Sep. 4, 1981 [ZA] South Africa ............. 81/6142

[51] Int. Cl.⁴ .................................................. E21F 13/00
[52] U.S. Cl. ................................ 414/339; 104/137; 105/238.1; 414/565
[58] Field of Search ................. 414/339, 565–567, 414/694; 104/162, 137; 105/65, 238.1

[56] References Cited

U.S. PATENT DOCUMENTS

| | | | |
|---|---|---|---|
| 1,550,239 | 8/1925 | Billings et al. | 414/339 |
| 1,879,203 | 9/1932 | Guilbert et al. | 414/339 |
| 1,881,828 | 10/1932 | Millar et al. | 104/162 |
| 3,145,057 | 8/1964 | Taggart. | |
| 3,272,357 | 9/1966 | Freni | 414/339 |
| 3,272,550 | 9/1966 | Peterson. | |
| 3,356,039 | 12/1967 | Fonden et al.. | |
| 3,556,013 | 1/1971 | Kruer et al. | 105/65 X |
| 3,712,489 | 1/1973 | Jamison. | |
| 3,871,302 | 3/1975 | Jamison. | |
| 3,902,434 | 9/1975 | Barnard et al.. | |
| 3,915,094 | 10/1975 | Sawada et al.. | |
| 4,188,165 | 2/1980 | Bohme et al. | 414/694 |
| 4,190,220 | 2/1980 | Hahn et al.. | |

FOREIGN PATENT DOCUMENTS

| | | |
|---|---|---|
| 803408 | 4/1951 | Fed. Rep. of Germany. |
| 2250665 | 6/1975 | France. |
| 1431577 | 4/1976 | United Kingdom. |

*Primary Examiner*—Robert J. Spar
*Assistant Examiner*—Stuart J. Millman
*Attorney, Agent, or Firm*—Brumbaugh, Graves, Donohue & Raymond

[57] ABSTRACT

In the particular embodiments of the invention described herein there is disclosed apparatus for loading particulate material into a train of coupled rail cars. The apparatus includes open topped rail cars which carry a continuous rail track of rails which are attached to the upper edges of the cars, a loading car which carries a ramp which leads from a low level to the track on the rail cars, a bucket loader and perhaps a conveyor for loading a self propelled load distribution vehicle which is adapted to run under its own power on the ramp and the track.

4 Claims, 6 Drawing Sheets

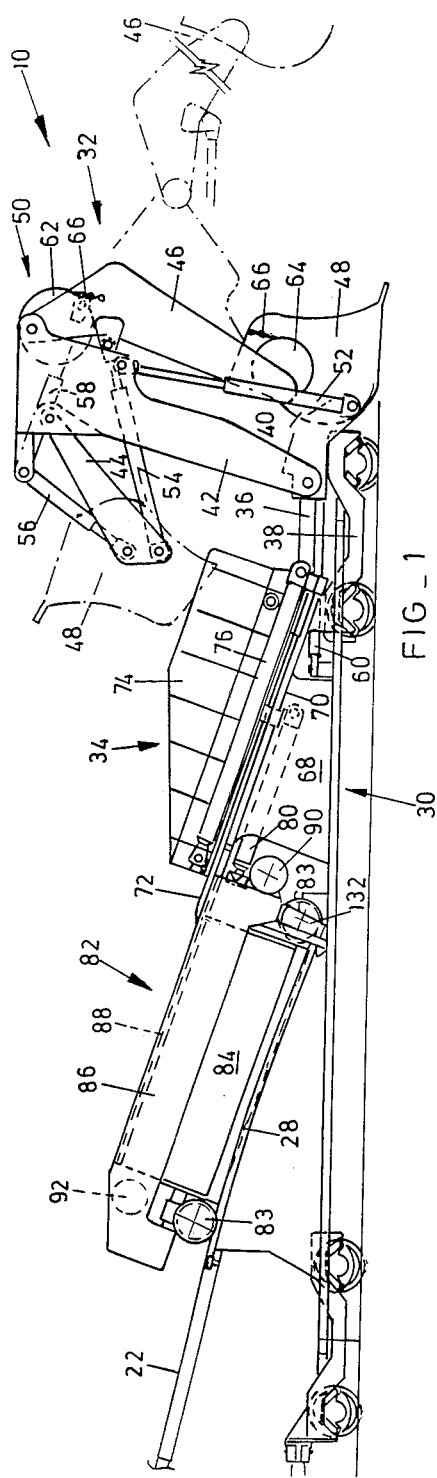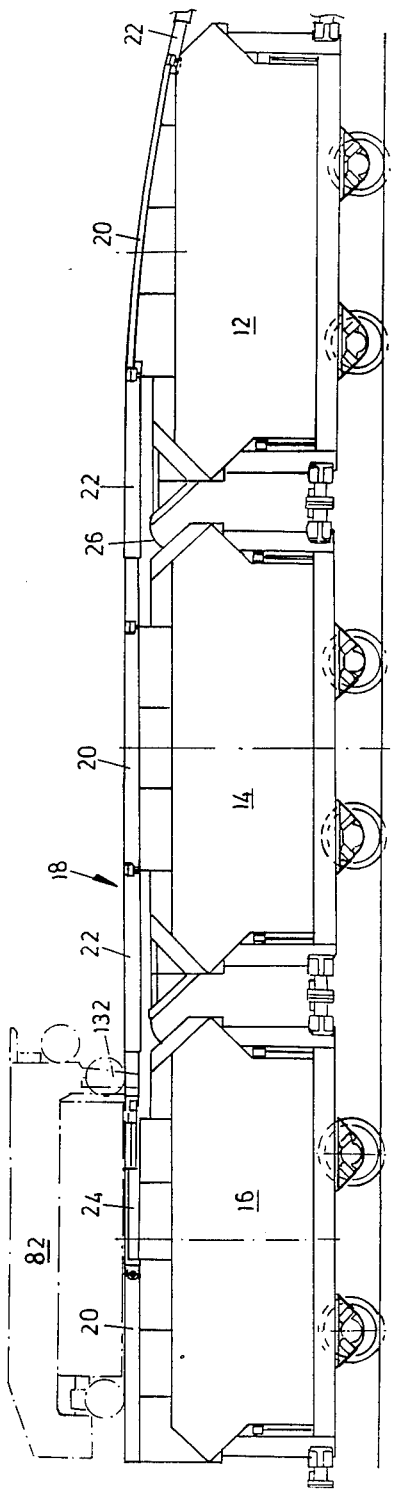

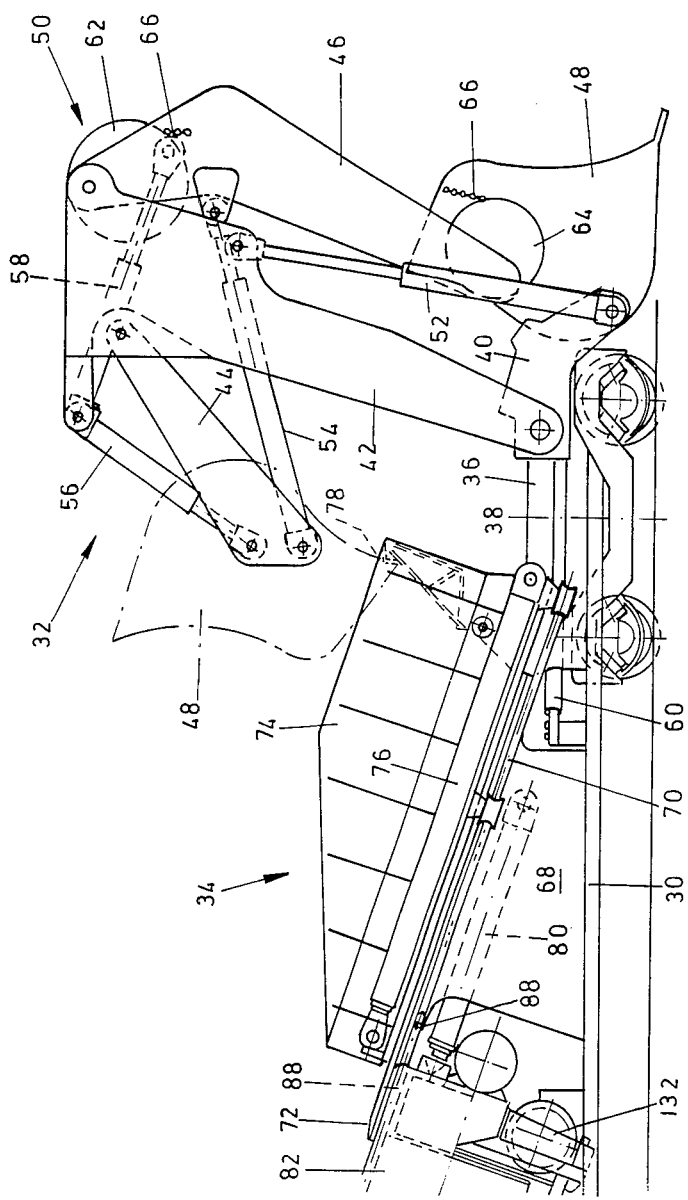
FIG_3

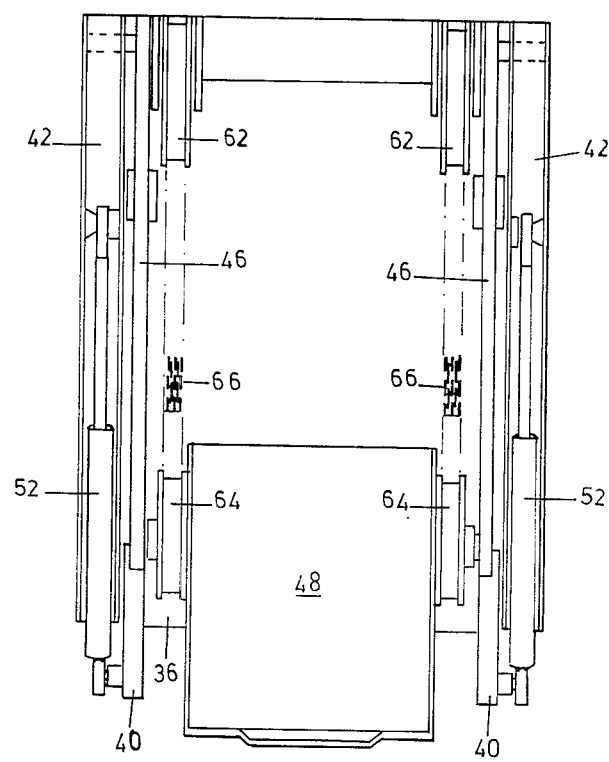
FIG_4

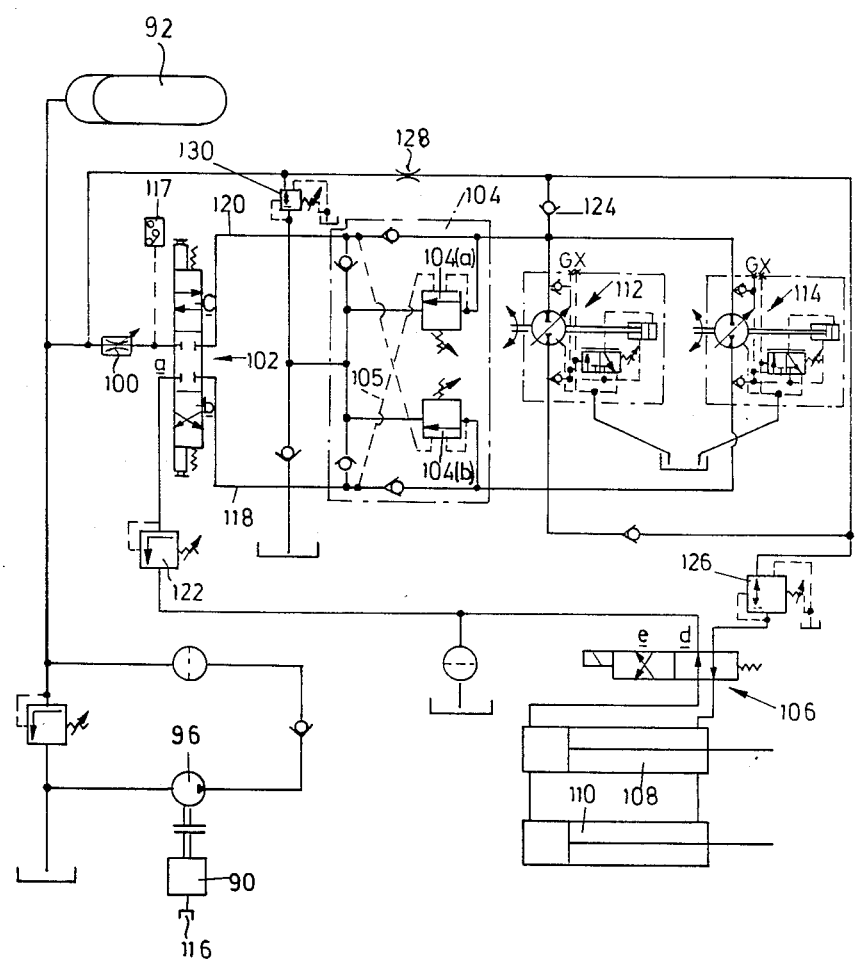
FIG_5

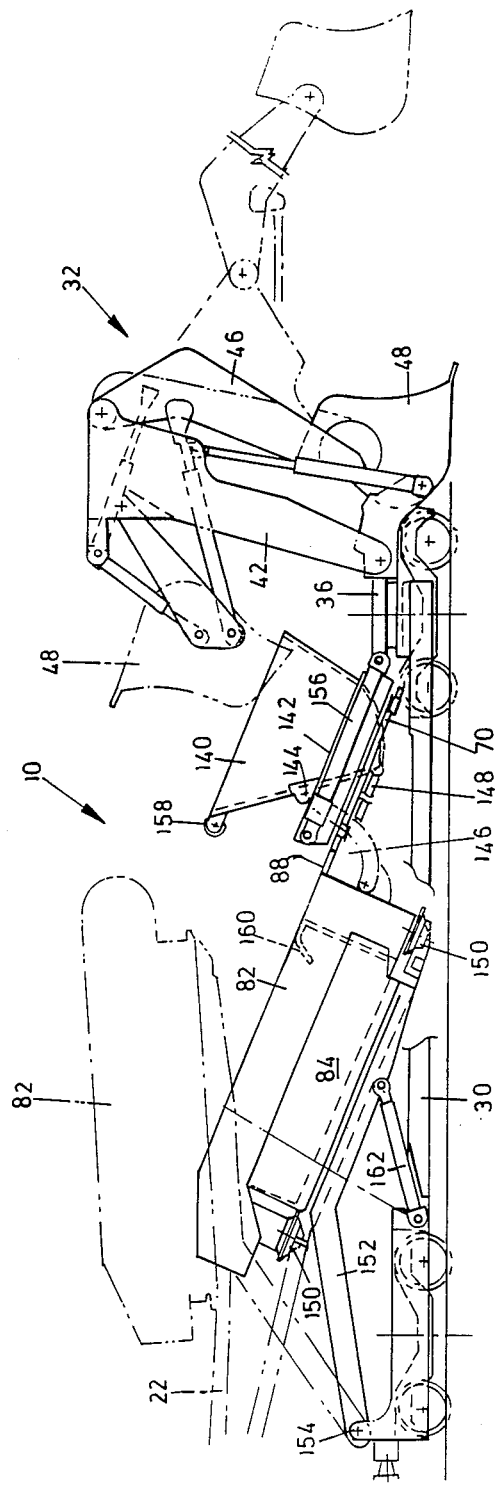

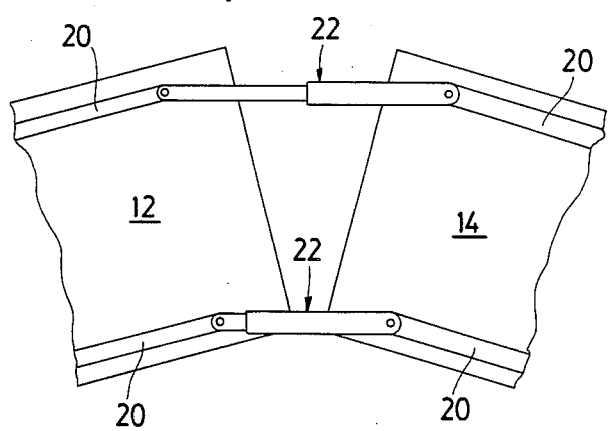
FIG_7

TUNNEL CLEANING TRAIN

FIELD OF THE INVENTION

This invention relates to a train for loading and transporting broken rock, coal or the like and more particularly for loading and transporting material from the working end of a tunnel in which there is limited work space.

BACKGROUND TO THE INVENTION

In one known form of tunnel end cleaning train a plurality of open-ended rail cars are coupled in line to form a longitudinally continuous load area. Each car in the train includes in its base an endless scraper conveyor. The train is loaded by a conveyor loader which transfers broken rock from the tunnel end onto the conveyor of the first car. The rock is then transported from that end of the train to the other by means of the car scraper conveyors. A major problem with trains of this type is that sideplates between the individual cars which shield the gaps between the cars severely limit the ability of the train, particularly when loaded, to negotiate curves in a track and so severely affects the utility of the train in underground mines. An additional and perhaps more serious problem is that a large amount of energy is consumed by the scraper conveyors in loading the train. Not only does this make operation of the train expensive, but makes the use of trailing power cables for the conveyors necessary.

Another form of train consists of a plurality of cars which have a continuous rail system attached to their upper edges for carrying a load distribution vehicle over the cars of the train. The car rail system leads from a low position in which the distribution vehicle is loaded with broken rock up a ramp and onto the rails of the first car of the train. The distribution vehicle is moved from its low-level loading position and over the rail system by means of ropes which are wound on and off cable drums at one end of the train. At least the return rope is guided over pulleys on the cars of the train. Difficulties with the rope drive system are that rope guiding complications arise when the train is being loaded while on a curve and the coupling and uncoupling of cars in the train is severely complicated by the ropes. Yet a further difficulty with trains of this type is that the distribution vehicles are adapted for bottom discharge through doors which are operated hydraulically or pneumatically making the use of hoses which trail the distributor over the length of its rail system necessary. The ropes and trailing hoses severely impede the speed of operation of the distributor on its rail system and so the loading time of the train. As the distributor is loaded by a relatively low capacity overhead loader the loading time of the train is higher than need be and its efficiency is reduced while the loader stands idle while the distributor is on the rail system over the train cars.

OBJECT OF THE INVENTION

It is the object of this invention to provide a tunnel cleaning train which will minimise the disadvantages to known trains mentioned above.

SUMMARY OF THE INVENTION

In one form of the invention the train includes a distributor loading ramp which leads from a position below the level of the rail track on the cars of the train to the track on the cars and the method includes the steps of loading the distributor vehicle on the low position of the ramp and then assisting the load distributor up the ramp onto the tracks by means, such as a hydraulic jack, which is external to the distributor.

In another form of the invention the train includes a distributor loading ramp which includes a pair of rails which are movable from a first position below the level of the rail track on the train cars to a second position in which the ramp rails are substantially level with the rail track on the train cars and the method includes the steps of loading the distributor on the ramp in its first position, lifting the ramp rails to their second position and then moving the distributor by means of its self-contained power source over the tracks on the train cars.

Preferably the distributor vehicle is moved by a self-contained hydraulic wheel drive system which includes a hydraulic fluid reservoir and a fluid pressure accumulator and the method includes the step of charging the accumulator with fluid under pressure as the distributor is being loaded.

Conveniently, the distributor vehicle is loaded by a bucket loader which incudes an upright support, an arm pivotally connected to the support and a bucket at the free end of the arm with the method including the step of moving the bucket from a digging position on one side of the support to a discharge position on the other side of the support on a path which lies below the point at which the bucket arm is pivotally connected to the support.

A train according to the invention includes a plurality of coupled rail container cars for carrying particulate material, rails on the cars which are joined to form a continuous track which extends over the length of the train of container cars and a self-propelled distributor vehicle on the track for loading particulate material into the container cars. Preferably a ramp is located at one end of the train on which the distributor vehicle may move from the track on the container cars to a relatively lower loading position. The loading ramp is preferably located on a loading car at one end of the train with the loading car including means for loading the distributor vehicle with the particulate material when located on the ramp of the car.

In one form of the invention the loader arrangement includes a bucket loader which includes an upright support, an arm pivotally connected to the support, a bucket on the free end of the arm and means for moving the bucket from a digging position on one side of the support to a discharge position on the other side of the support on a path which lies below the point at which the bucket arm is pivotally connected to the support. The support for the bucket arm is conveniently located on a turntable on the loading car and the loading car includes means for rotating the turntable and so the support about a substantially vertically axis.

Further according to the invention the loading arrangement includes a conveyor with the bucket loader being adapted to discharge particulate material onto the conveyor and the conveyor in turn being adapted to discharge the material into the distributor vehicle. The loading car may additionally include a hydraulic ram adapted to assist the distributor vehicle up the ramp onto the track once it has been loaded on the ramp by the loading arrangement.

In another form of the invention the ramp is movable on the loading car from a first position in which it is substantially horizontally aligned with the track on the container cars and its second relatively lower loading position and the train includes means for moving the ramp between its first and second positions of operation.

The distributor vehicle preferably consists of a bottom discharge container body, wheels on the body for engaging the rails of the track on the container cars, a motor connected to at least one of the wheels and a power source on the vehicle adapted to drive the or each motor to propel the distributor vehicle on the track. The power source is conveniently a hydraulic fluid pressure accumulator and the or each motor is a hydraulic motor. The loading car of the train conveniently includes means for charging the fluid pressure accumulator on the distributor vehicle while the distributor is being loaded on the ramp.

A loading car for use with a train according to the invention includes a rail wheel chassis, a loading ramp on the chassis for moving a particulate material distributor vehicle between a loading position and a second position which is elevated relatively to the loading position and a loader arrangement for loading the distributor when in the loading position on the ramp.

In one form of the invention the loader arrangement is a bucket loader which includes an upright support, an arm pivotally connected to the support, and a bucket on the free end of the arm and means for moving the bucket from a digging position on one side of the support to a discharge position on the other side of the support on a path which lies below the point at which the bucket arm is pivotally connected to the support. Preferably, the loader support is mounted on a turntable on the loading car and the loading car includes means for rotating the turntable and so the support about a vertical axis on the loading car.

The loading car may include a conveyor which is located on the car between the discharge position of the bucket loader and a position in which it is adapted to discharge material into the distributor vehicle when the distributor is in its loading position on the ramp. The loading car conveniently includes means for hydraulically charging a hydraulic fluid pressure accumulator on the distributor vehicle when in its loading position on the ramp.

BRIEF DESCRIPTION OF THE DRAWINGS

The invention is now described by way of example only with reference to the drawings in which:

FIG. 1 is a side elevation of the loading car of the train of the invention,

FIG. 2 is a side elevation of the remaining portion of the train,

FIG. 3 is an enlarged fragmentary side elevation of the loading car of FIG. 1,

FIG. 4 is an end elevation of the bucket loader when seen from the right in FIG. 3, FIG. 5 is a schematic drawing of the hydraulic circuit of the distributor vehicle, FIG. 6 is a side elevation of a second embodiment of the loading car of the invention, and FIG. 7 is a schematic top view showing a portion of the train of FIG. 2 illustrating the operation of the telescopic rail sections.

DETAILED DESCRIPTION OF THE DRAWINGS

The loading car 10 of FIG. 1 is used attached to the car 12 of the train of FIG. 2.

The train, as seen in FIG. 2, includes three bottom discharge hoppers 12, 14 and 16. Only three hoppers have been illustrated in the drawings for simplicity of illustration, and in practice the train will include more than one hopper 14.

The hoppers are conventional bottom discharge hoppers on which a rail system 18 is located. The rail system consists of tube rails 20 which are fixed to the longitudinal upper edges of the hoppers and intermediate telescopic rails 22 which are pivotally connected at each end to the ends of the rails 20 of adjacent hoppers to provide effective lengthening and shortening of the opposite rails when the train is located in or in the process of negotiating a curve in its track as shown in FIG. 7. The hopper at the end of the train carries hydraulic piston and cylinder buffers 24 which are held parallel to the rails 20.

The hoppers of the train carry on one end a lip 26 which terminates in the loading space of the adjacent hopper to shield the space between the hoppers to minimise spilling during loading.

As seen in FIG. 2, the rails 20 of the hopper 12 slope downwardly towards the loading car 10 and are joined to sloping rails 28 on the car 10 by telescopic rails 22.

The loading car 10 of the train includes a wheeled chassis 30 on which is mounted a swingthrough underarm loader 32, a scraper conveyor 34 and the rails 28.

The loader 32 includes a turntable 36 which is rotatable on an axis 38 and carries sideplates 40 on which a two-arm support frame 42 is pivotally mounted, lever arms 44 which are pivotally connected to the arms of the frame 42, a pair of dipper arms 46 which are each pivotally connected at one end to the arms of the frame 42 and at their other ends to the sides of a loading bucket 48, a bucket rotating arrangement indicated generally at 50 and hydraulic jacks 52, 54, 56 and 58. A pair of slewing jacks 60 is connected between the chassis 30 and the turntable 36 for rotating the turntable on its axis 38 to vary the loading direction of the bucket 48. The jacks 60 are arranged hydraulically to be self-centering.

The loader jacks 54 and 56, through the lever arms 44, control the extension of the dipper arms and bucket 48 and their swing through the arms of the frame 42. The jack 52 controls the angle of inclination of the frame 42.

The bucket rotating arrangement 50 rotates the bucket 48 between its digging position, illustrated in dotted lines to the right of the loader in FIG. 1, its dumping position on the left of the loader in the drawing, and maintains the concavity of the bucket face up as the bucket is moved on its low-level operating path between the arms of the frame 42 from its digging to dumping positions. The bucket rotating arrangement consists of drums 62, which are more clearly seen in FIG. 4, and which are rotatable on axles on the arms 42 which are displaced from the pivot axles of the arms 42 with the dipper arms, drums 64 which are eccentrically fixed for rotation to the side of the bucket 48 and chains 66. The chains 66 are anchored at one end to a dipper arm and pass over the drums 62 and 64 to be anchored at the other ends to the bucket. The drums 62 are rotatable by means of the jacks 58 and this arrangement in turn causes rotation of the drums 64 through the chains 66.

The scraper conveyor 34 includes an upwardly sloping frame 68 on which a pair of space rails 70 are mounted, a flat bedplate 72, a scraper bin 74 which is U-shaped in plan and which is open at its forward end and a pair of hydraulic rams 76 for moving the bin 74 over the bedplate 72. An abutment member 78 is located against the backface of the bin 74 to limit rotation of the loader bucket 48 during its dumping phase of operation. A long reach jack 80 is located between the sloping conveyor frame members 68 and serves the dual function of a buffer and a pusher for a load distribution vehicle 82.

The load distributor 82 is low-profile bottom discharge hopper which includes wheels adapted to engage and run on the rail system 18 over the hopper train. The double doors 84 of the distributor are pivotally connected to the vehicle body 86 and are opened and closed by means of hydraulic jacks, not shown, which are connected to act between them. The inner upper longitudinal walls of the distributor body 86 carry rails 88 which, when the distributor is in its loading position, as illustrated in FIG. 1, lie alongside and are spaced from the rail 70 on the conveyor frame 68.

The distributor additionally carries an electric motor 90 which is connected to a hydraulic pump which in not shown in the drawing, and a hydraulic fluid pressure accumulator 92 to which the pump is connected. The rear end of the distributor carries a conically shaped self-centering socket for engaging a cone on the end of the ram 80 and an electrical connector not shown which automatically couples with a connector on the conveyor frame when the distributor is in its loading position to run the motor and pump to charge the accumulator 92 while the distributor is being loaded.

The hydraulic circuit of the distributor is shown in FIG. 5 to include the electric motor 90, and hydraulic pump 96, the hydraulic fluid pressure accumulator 92, an adjustable fluid flow regulator 100, a system control valve 102, a motor control valve 104, a door ram control valve 106, two piston and cylinder rams 108 and 110 for opening and closing the distributor discharge doors and two variable displacement motors (high pressure dependent displacement control) 112 and 114 which are suitably connected to the distributor wheels.

While the distributor is in its loading position on the rails 28 an electrical connector 116 on the motor 90 is connected to an automatically engageable and disengageable electrical connection on the distributor ramp and while the distributor remains in its loading position on the ramp the motor 90 and pump 96 are running to charge the accumulator 92 to its working pressure of about 300 bar. When the accumulator is fully charged a pressure switch 117 cuts the electrical supply to the motor 90.

While the distributor is on its loading ramp the control valve 102 is in position a and the valve 106 is in position d, and the doors 84 of the distributor are held in their closed position by hydraulic fluid under pressure in the door rams 108 and 110.

In use, the bin 74 of the scraper conveyor is loaded by the loader 32. The ram 76 is then actuated to cause the bin 74 to scrape the load from the bed 72 into the waiting distributor. The wheels of the bin 74 move from the rail 70 onto the distributor rails 88 so that the scraper bin may evenly distribute the load in the distributor. The bin 74 then returns to its loading position as illustrated and the loader commences recharging the bin.

As the scraper bin reaches its rearmost position after fully loading the distributor the ram 80 propels the distributor up the rail ramp 28. The valve 102 of the hydraulic circuit is simultaneously, through an interlock arrangement, switched to its position b and fluid flows through line 118, a valve 104 (b) of the motor control valve 104 and to the motor 112 and 114 to, with the aid of the ram 80, drive the distributor onto the rail system over the hoppers. The line 120 is simultaneously opened through valve 104 (a) which is actuated through a pilot line 105 and valves 102 and 122 to tank.

The regulator 100 will allow only an adjusted maximum oil flow from the accumulator to govern the distributor speed. If for any reason the distributor should run away from its driven speed the fluid pressure in the line 118 will drop and the consequent loss of pilot fluid pressure in the line 105 will cause the valve 104 (a) to close to block the fluid return line 120.

The valves 102 and 106 are operated electrically from a position remote from the distributor by radio control and when the distributor approaches its discharge position over a hopper to be loaded valve 102 is switched to positions a and valve 106 to position e. The motors 112 and 114 are now caused to act as pumps and pump fluid through a check valve 124, a pressure reducing valve 126, through the valve 106 and into the rams 108 and 110 to open the doors of the distributor. Excess fluid is passed back to the circuit through an adjustable throttling restrictor 128 until the back pressure on the motors brings the distributor to a halt. Make-up fluid is fed back into the circuit through a pressure reducing valve 130 which is set to operate at a lower fluid pressure than the valve 122.

When the last hopper 16 in the train has been reached and for any reason the radio control has not been switched to bring the valve 102 into position a a proximity function switch will override the radio control and valve 102 will be switched to position a and valve 106 to position e. Additionally, an arm 132 on the distributor will engage the buffer ram 24 on the hopper 16 to decellerate and stop the distributor over the hopper.

To return the distributor to its loading position, valve 102 is switched to position c and valve 106 to position e. Fluid is now caused to flow through line 120 and control valve 104 to drive the motors. The doors are held open during the return of the distributor to profile the upper surface of the load in the hoppers. As the distributor runs down the ramp to its loading position it engages the extended buffer ram 80 which decelerates the distributor to a halt in its loading position on the loading car 10. The valve 102 is switched to position a and valve 106 to position d to close the distributor doors for loading. Fluid now flows from the motors through the control valve 128 and pressure reducing valve 130 back into the circuit. When the distributor is in its position of rest under gravity on the loading ramp the electrical connection is again automatically made through the connection 116 to cause the accumulator 92 to be recharged by the pump which is driven by the motor 90.

From the above description of the train of the invention it will be apparent that neither trailing pneumatic or hydraulic lines nor ropes are necessary for the operation of the distributor and that the turn around time of the distributor is considerably speeded up by means of the scraper conveyor 34 which is loaded by the loader while the distributor is on the rail system 18. Calculations have shown that the operation of the train of the invention requires less power than a rope operated system and less than 10% of the power required to operate a system which employs scraper conveyors which are located in the cars of the train.

A second embodiment of the loading car 10 of the invention is illustrated in FIG. 6. The principal differences between the FIGS. 1 and 6 embodiments of the loading car of the invention lie only in the distributor loading arrangement, the distributor and the conveyor of the terminal car of the train.

Like reference numbers in FIG. 6 denote like components in the remaining drawings.

In the FIG. 6 embodiment of the loading car the conveyor consists of a bucket arrangement 140 which operates on the rail 70 as with the scraper 34 of the previous embodiment. The bucket 140 is pivotally located in a U-shaped frame 142 which is movable on the rail 70 by hydraulic rams 156.

The bucket 140 carries two lugs 144 which rest on the frame 142 and about which the bucket is pivotable. A downwardly dependent arm 146 is pivotally connected to the forward face of the bucket and is in turn connected to the base of the bucket by means of a shock absorber 148.

The distributor 82 is substantially identical to that of the previous embodiment. A major difference, is however, its wheels 150 which are dish-shaped and are rotatable on a substantially vertical axis. The purpose of the changed configuration of the wheels is to allow more lateral movement of the distributor on the rail system of the train and more particularly bends in the system and to increase the rolling efficiency of the wheels on the track.

A further major difference between the two trains is that the distributor rails on the terminal car are located on a ramp 152 which is pivotally connected at 154 for movement between the low-level solid line position and the raised dotted line position in FIG. 6. Telescopic rails 22 are pivotally connected between the ramp and the container 12 of the train. In the dotted line position of the ramp in FIG. 6 are rails on the ramp and the linking telescopic rail 22 are substantially in horizontal alignment with the track 18 on the train.

In use, the loader bucket loads the conveyor bucket 140 as illustrated in dotted lines in FIG. 6 in much the same manner as the conveyor 34 was loaded in the FIG. 1 embodiment. When loaded, the bucket 140 is moved forwardly on its rail 70 and onto the rails 88 of the distributor by a jack 156. The free end of the curved arm 146 of the conveyor bucket abuts the rear wall of the distributor as the bucket moves onto the distributor and causes the bucket 140 to tip forwardly into the distributor. Continued forward movement of the bucket spreads the load evenly in the distributor. As the empty and tipped bucket is retracted by the jack 156 the forward tipped end of the bucket levels the load in the distributor until a roller 158 on the forward lip of the bucket is moved upwardly by a striker plate 160 on the rear wall of the distributor to rotate the bucket back to its upright position as it is moved to the loading position illustrated in the drawings.

A pair of rams 162, which act between the chassis 30 of the loading car 10 and the ramp 152, are then activated to raise the ramp with its rails to the dotted line position in FIG. 1 in which the ramp rails are, as mentioned above, substantially level with the rails of the rail system on the train cars.

The invention is not limited to the precise constructional details herein described and for example the hydraulic drive circuit of the distributor is not limited to that illustrated in FIG. 5 but could well be that described in our co-pending South African patent application of the same date as this and entitled "SELF-PROPELLED LOAD DISTRIBUTOR VEHICLE".

Although only rail vehicles are described and illustrated in this specification the invention could apply equally well to non rail vehicles.

What is claimed is:

1. A tunnel cleaning train comprising a plurality of rail cars adapted to carry particulate material and coupled together, each rail car having a pair of fixed rails mounted thereon in spaced parallel relation, connecting rail means between each of the corresponding rails of adjacent cars comprising a telescopic rail section and pivot means pivotally connecting each end of the telescopic rail section to the adjacent end of the corresponding rail section in the adjacent cars so as to provide a continuous articulated track extending on and between the plurality of cars, a particulate load distribution vehicle carried by the track including a load carrying body with an open top and at least one door at the bottom to permit transfer of particulate material from the vehicle to the rail cars, door drive means mounted on the vehicle for opening and closing the door, a plurality of wheel means mounted on the vehicle for rotation on substantially vertical axes to support the vehicle for rolling motion on the track, each wheel means having a substantially conical lower rail-engaging surface surrounding a central projection providing support for the vehicle on track portions having varying rail spacing, vehicle drive means mounted on the vehicle and connected to at least one of the wheel means for driving the vehicle on the track, a loading car carrying a ramp track which is pivotally connected at one end to the continuous articulated track carried by the rail cars, means for moving the ramp track between a horizontal position substantially aligned with the rails of the articulated track and another position in which at least a portion of the ramp track is below the level of the articulated track to permit loading of the vehicle, a pair of rails mounted on the vehicle and vehicle loading means moveable on the pair of rails when the vehicle is on the ramp track to convey particulate material to the body of the vehicle.

2. A tunnel cleaning train according to claim 1 wherein the wheel means are disposed forwardly and rearwardly of the load carrying body to permit a low body height and center of gravity for the vehicle.

3. A tunnel cleaning train according to claim 1 including hydraulic circuit means mounted on the vehicle for supplying hydraulic power to the door drive means and the vehicle drive means comprising rechargeable hydraulic accumulator means and means for regeneratively recharging the accumulator means during braking of the vehicle.

4. A tunnel cleaning train according to claim 1 including bucket means moveably mounted on the loading car to collect particulate material and transfer it to the vehicle loading means.

* * * * *